(12) United States Patent
Babazadeh et al.

(10) Patent No.: US 9,385,609 B2
(45) Date of Patent: Jul. 5, 2016

(54) ANALOG CURRENT ESTIMATION AND DIGITAL ESTIMATION CORRECTION FOR A MULTIPHASE BUCK CONVERTER

(71) Applicant: Infineon Technologies AG, Neubiberg (DE)

(72) Inventors: Amir Babazadeh, Laguna Hills, CA (US); Benjamim Tang, Rancho Palos Verdes, CA (US); Giuseppe Bernacchia, Villach (AT)

(73) Assignee: Infineon Technologies AG, Neubiberg (DE)

( * ) Notice: Subject to any disclaimer, the term of this patent is extended or adjusted under 35 U.S.C. 154(b) by 112 days.

(21) Appl. No.: 14/180,856

(22) Filed: Feb. 14, 2014

(65) Prior Publication Data

US 2015/0236595 A1   Aug. 20, 2015

(51) Int. Cl.
*H02M 3/158* (2006.01)
*H02M 3/157* (2006.01)
*H02M 1/00* (2006.01)

(52) U.S. Cl.
CPC ............ *H02M 3/1584* (2013.01); *H02M 3/157* (2013.01); *H02M 2001/0009* (2013.01); *H02M 2003/1586* (2013.01)

(58) Field of Classification Search
CPC .............. H02M 3/157; H02M 3/1584; H02M 2003/1586; H02M 2001/0009; H02M 2001/0012; H02M 2001/0025; H02M 3/152; G01R 21/06
See application file for complete search history.

(56) References Cited

U.S. PATENT DOCUMENTS

| | | | |
|---|---|---|---|
| 5,982,160 A | 11/1999 | Walters et al. | |
| 6,433,527 B1 * | 8/2002 | Izadinia et al. | 323/300 |
| 2004/0046535 A1 | 3/2004 | Duffy et al. | |
| 2010/0131219 A1 | 5/2010 | Kenly et al. | |
| 2011/0267019 A1 * | 11/2011 | Krishnamurthy et al. | 323/283 |
| 2011/0316508 A1 * | 12/2011 | Cheng et al. | 323/282 |
| 2012/0078556 A1 | 3/2012 | Holmberg et al. | |
| 2012/0139514 A1 | 6/2012 | Paatero | |
| 2012/0223692 A1 * | 9/2012 | Prodic et al. | 323/283 |
| 2012/0293155 A1 * | 11/2012 | Chan et al. | 323/317 |
| 2013/0009479 A1 | 1/2013 | Khanna et al. | |
| 2013/0049712 A1 * | 2/2013 | Ueno | H02M 3/1584 323/234 |
| 2015/0207410 A1 | 7/2015 | Ono | |

FOREIGN PATENT DOCUMENTS

DE   102010002078 A1   8/2011

OTHER PUBLICATIONS

Kuang-Yao Cheng; Feng Yu; Lee, F.C.; Mattavelli, P., "Digital Enhanced V2-Type Constant On-Time Control Using Inductor Current Ramp Estimation for a Buck Converter With Low-ESR Capacitors," Power Electronics, IEEE Transactions on , vol. 28, No. 3, pp. 1241-1252, Mar. 2013.*

* cited by examiner

*Primary Examiner* — Harry Behm
*Assistant Examiner* — Peter Novak
(74) *Attorney, Agent, or Firm* — Murphy, Bilak & Homiller, PLLC

(57) ABSTRACT

A phase current estimator for a switching power converter includes analog circuitry for generating a phase current estimate error by comparing a phase current of the switching power converter to an analog representation of an estimate of the phase current. The phase current estimator further includes digital circuitry for revising the phase current estimate based on the phase current estimate error and a plurality of parameters associated with operation of the switching power converter. An estimator fault detection unit is provided for determining whether a difference between the phase current and estimate exceeds a threshold for indicating substandard phase current estimation.

21 Claims, 12 Drawing Sheets

ANALOG CURRENT ESTIMATION AND DIGITAL ESTIMATION CORRECTION FOR A MULTIPHASE BUCK CONVERTER

TECHNICAL FIELD

The present application relates to switching power converters, in particular phase current sensing and estimation in switching power converters.

BACKGROUND

Switching power converters are widely used in modern electronic systems for a variety of applications such as computing (server and mobile) and POLs (Point-of-Load Systems) for telecommunications because of their high efficiency and small amount of area/volume consumed by such converters. Widely accepted switching power converters include buck, boost, buck-boost, forward, flyback, half-bridge, full-bridge, and SEPIC topologies. Multiphase buck converters are particularly well suited for providing high current at low voltages needed by high-performance integrated circuits such as microprocessors, graphics processors, and network processors. Buck converters are implemented with active components such as a pulse width modulation (PWM) controller IC (integrated circuit), driver circuitry, one or more phases including power MOSFETs (metal-oxide-semiconductor field-effect transistors), and passive components such as inductors, transformers or coupled inductors, capacitors, and resistors. Multiple phases can be connected in parallel to the load through respective inductors to meet high output current requirements.

Modern and high performance power supplies need phase current information to provide the load with high quality power. Phase current information is critical in providing key features such as phase fault detection, current balancing, power saving modes, over current and negative current protection, and improved transient response. Conventional multi-phase digital switching power converters include current sense/sampling networks for obtaining phase current information. However conventional current sampling networks consume a lot of power and area on the controller chip (die), thus creating a need for a high performance current sampling network with low power and area consumption.

For example, one conventional approach for sampling phase current information is a high resolution and high speed current flash ADC (analog-to-digital converter). Flash ADCs provide fast conversion and high precision, but are high cost and high leakage current, high power and area consumption on the controller chip. Another conventional approach for obtaining phase current information is a tracking ADC. However, tracking ADCs are susceptible to noise, have relatively high power and area consumption on the controller chip and have poor tracking capability and performance at high switching frequencies. Still another conventional approach for obtaining phase current information is a Sigma-Delta ADC. However, Sigma-Delta ADCs have poor tracking capability at high switching frequencies, require over-sampling at a rate much larger than the signal bandwidth, and have significant latency between the digital outputs and corresponding sampling instants.

SUMMARY

According to an embodiment of a phase current estimator, the phase current estimator comprises analog circuitry operable to generate a phase current estimate error by comparing a phase current of a switching power converter to an analog representation of an estimate of the phase current. The phase current estimator further comprises digital circuitry operable to revise the phase current estimate based on the phase current estimate error and a plurality of parameters associated with operation of the switching power converter.

According to an embodiment of a switching power converter, the switching power converter comprises a phase operable to deliver a phase current to a load and a phase current estimator. The phase current estimator comprises analog circuitry operable to generate a phase current estimate error by comparing a phase current of a switching power converter to an analog representation of an estimate of the phase current. The phase current estimator further comprises digital circuitry operable to revise the phase current estimate based on the phase current estimate error and a plurality of parameters associated with operation of the switching power converter. The switching power converter can further comprise an estimator fault detection unit operable to compare the phase current to the phase current estimate to determine whether a difference between the phase current and the phase current estimate exceeds a threshold for indicating substandard phase current estimation.

According to an embodiment of a method of estimating phase current in a switching power converter, the method comprises: comparing a phase current of the switching power converter to an estimate of the phase current by analog circuitry to generate a phase current estimate error; and revising the phase current estimate by digital circuitry based on the phase current estimate error and a plurality of parameters associated with operation of the switching power converter.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein improve the performance of the phase current tracking loop of a switching power converter by using an estimate of the phase current generated based on system information such as the input voltage, output voltage, output inductance and the state of the PWM signal used to control the phases of the switching power converter. A closed loop system can be formed by a linear feedback. In addition, a nonlinear integrator feedback can be provided which can compensate for parameter tolerances and poor phase current estimates. The phase current estimation embodiments described herein can combine real and estimated phase current information, to yield very high performance in both tracking and noise rejection. As a result, the entire switching power converter system need not be run with high clock rates. Instead an analog part of the phase current estimator can operate at much slower rates than the digital part of the estimator, reducing the on-chip power consumption compared to conventional methods with a single clock rate for the entire switching power converter system while yielding the same or better performance. The phase current sampling estimation embodiments described herein are also less sensitive to quantization and measurement noise, and can reconstruct a missing positive ramp of the phase current, estimate the phase current during a high impedance (HiZ) mode, implement a very effective and simple estimator fault detector for detecting inaccurate current estimation and poor (substandard) tracking conditions, and provide adaptive adjustment for parasitics and inductor value tolerances.

Figure 1:
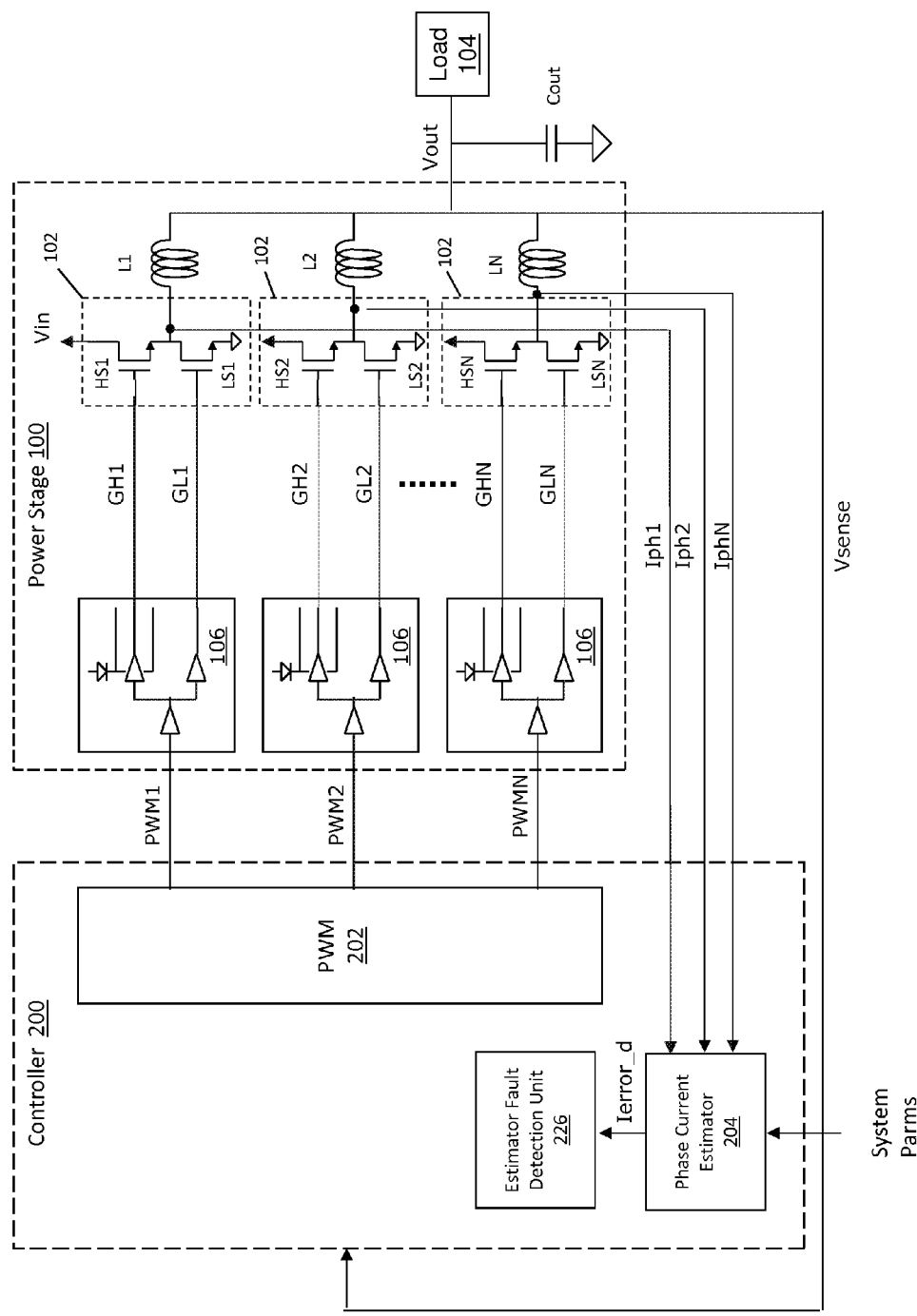
FIG. 1 illustrates a block diagram of an embodiment of a switching power converter with phase current estimation and estimator fault detection.

FIG. 1 illustrates an embodiment of a switching power converter comprising a power stage 100 including a plurality of phases 102 and a controller 200 such as a microcontroller, microprocessor, ASIC (application-specific integrated-circuit), etc. for controlling operation of the power stage 100. The power stage 100 provides a regulated voltage to the load 104. Each phase 102 of the power stage 100 is operable to deliver a phase current (IphX) through a separate inductor (LX) to a load 104 connected to the switching power converter via the inductors and an output capacitor (Cout). The load 104 can be a high-performance integrated circuit such as a microprocessor, graphics processor, network processor, etc. or other type of electronic circuit requiring voltage regulation.

Each phase 102 has a high-side switch (HSX) and a low-side switch (LSX) for coupling to the load 104 through the corresponding inductor. The high-side switch of each phase 102 switchably connects the load 104 to an input voltage (Vin) of the switching power converter, and the corresponding low-side switch switchably connects the load 104 to ground at different periods. Three phases 102 are shown in FIG. 1 (N=3) for ease of illustration only, however the power stage 100 can include any number of phases 102 including a single phase or more than one phase.

The controller 200 regulates the voltage (Vsense) delivered to the load 104 by the power stage 100, by adjusting the phase currents delivered to the load 104. The controller 200 includes a pulse width modulator (PWM) 202 for switching each phase 102 of the power stage 100 switches. Once the load current is low (e.g. lower than half of the phase current), synchronous converters allow the negative current (reverse current) to flow through the low-side switches and where it is dissipated. However if a low-side switch is off, the corresponding body diode cannot conduct the reverse current and it stays in HiZ (high impedance) or zero current which is called DCM (discontinuous conduction mode). The switching power converter can also operate in a continuous conduction mode (CCM) with current sinking capability.

The drivers 106 provide gate drive signals (GHX, GLX) to the gates of the high-side and low-side switches of the corresponding phases 102, in response to the PWM control signals (PWM1, PWM2, . . . , PWMN) provided by the PWM 202. The activation state of the phases 102 and the duty cycle of the high-side and low-side switches are determined at least in part based on the output voltage (Vsense) applied to the load 104 so that the switching power converter can react as quickly and reliably as possible to changing load conditions.

The controller 200 can manage changes from one reference voltage to another. The controller can also determine errors between the output voltage (Vsense) and a reference voltage, and convert the error voltage into a digital representation provided to the PWM 202 for modifying the switching cycle of the phases e.g. by adjusting the duty cycle of the PWM control signals. Such voltage regulation functions are standard in typical digitally-controlled switching power converters, and therefore no further explanation is given in this regard.

In addition to regulating the voltage delivered to the load 104, the controller 200 also includes a phase current estimator 204 for estimating and sampling the sensed phase currents (Iph1, Iph2, . . . , IphN) of the phases 102 and converting the analog sensed current information into sampled (digital) current information. The phase current estimator 204 can also convert the sampled phase current information into adjustments to the duty cycle of the PWM control signals for adjusting the phase currents so they remain balanced.

Figure 2:
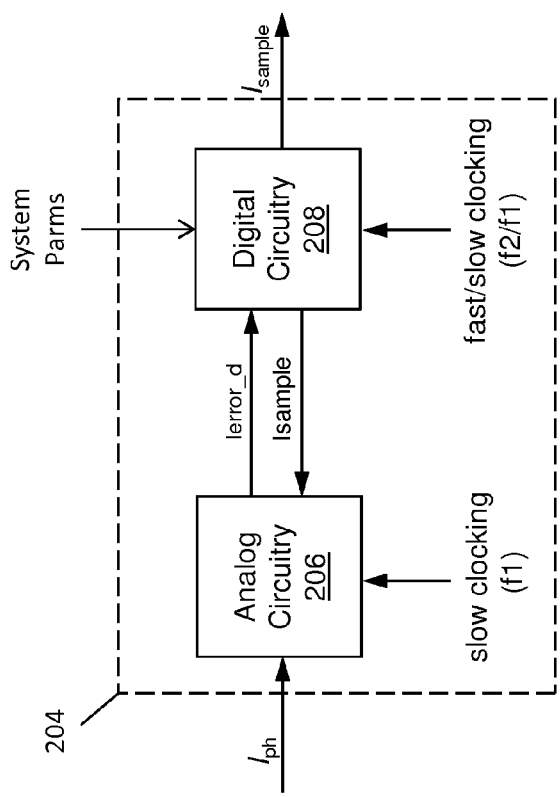
FIG. 2 illustrates a block diagram of analog and digital circuitry comprising a phase current estimator included in the switching power converter of FIG. 1.

FIG. 2 illustrates the phase current estimator 204 in more detail. The phase current estimator 204 includes analog circuitry 206 and digital circuitry 208. The analog circuitry 206 operates at a lower rate f1 compared to the digital circuitry 208 which is clocked at a faster rate f2 (f2>>f1), resulting in less power and smaller area consumption on the controller chip (die) and a more efficient current sampling network. For example, a small size ADC (analog-to-digital converter) with a low number of bits and a slow DAC (digital-to-analog converter) can still perform very well. The digital circuitry 208 runs at a higher clocking rate (f2) at which nonlinear computations and algorithms for better phase current tracking can be performed. The digital circuitry 208 calculates and adjusts the positive and negative ramps of the phase current to improve the phase current tracking capability of the switching power converter.

In one embodiment, the analog circuitry 206 generates a phase current estimate error (Ierror_d) by comparing a phase current (Iph) of the switching power converter to an analog representation (Iph_estimate) of the sampled phase current estimate (Isample) at a first clock rate (f1), the first clock rate being insufficient to accurately track the phase current. That is, the first clock rate is not high enough to sample and track the instantaneous phase current. Instead, the phase current estimator 204 generates an estimate of the phase current based on the error information provided by the analog circuitry 206 and a plurality of parameters associated with operation of the switching power converter such as input voltage (Vin), output voltage (Vout) and the state of the PWM control signals. The digital circuitry 208 revises the phase current estimate (Isample) at a second clock rate (f2) greater than the first clock rate based on the phase current estimate error (Ierror_d) and the system parameters provided to the digital circuitry 208. This way, the phase current is estimated at a higher clock rate in the digital domain 208 than supported by the analog circuitry 206 and therefore less complex and lower power analog circuitry 206 can be used e.g. as compared to a tracking ADC or a Sigma-Delta ADC.

Figure 3:
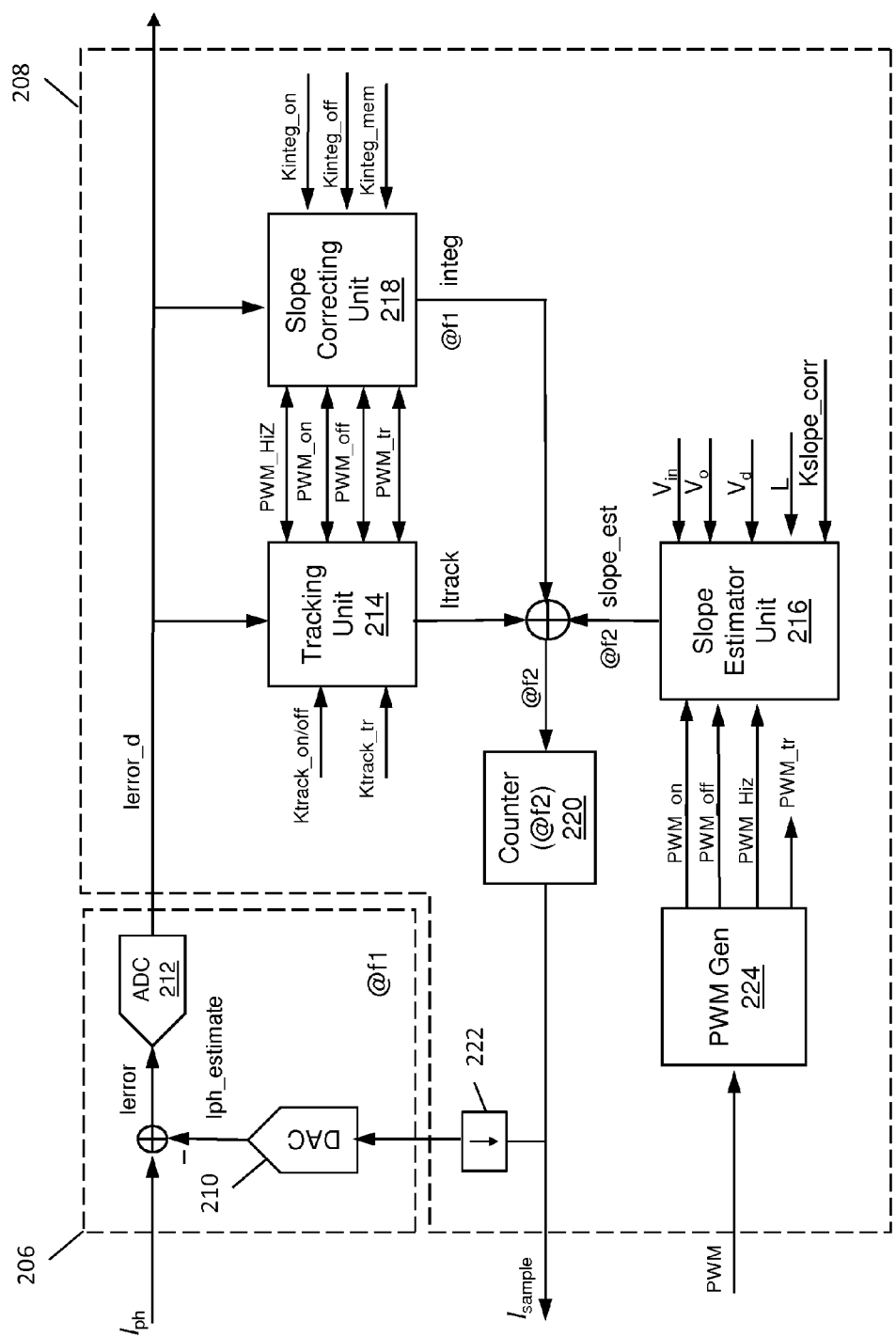
FIG. 3 is a more detailed illustration of the analog and digital circuitry of the phase current estimator.

FIG. 3 illustrates one embodiment of the analog and digital circuitry 206, 208 of the phase current estimator 204. According to this embodiment, the analog circuitry 206 comprises a DAC 210 having N bits of precision for converting the phase current estimate (Isample) generated by the digital circuitry 208 to a corresponding analog representation (Iph_estimate) at the lower first clock rate f1 e.g. f1<<f2. The analog phase current estimate (Iph_estimate) is then subtracted from the phase current (Iph) to generate the analog error signal (Ierror). The DAC 210 can be a small size and low resolution DAC since f1<<f2. An ADC 212 converts the analog error signal to a digital error signal (Ierror_d) at the lower first clock rate f1, for analysis by the digital circuitry 208 of the phase current estimator 204. The ADC 212 can comprise a plurality of comparators for converting the analog error signal to a corresponding digital signal.

Further according to the embodiment of FIG. 3, the digital circuitry 208 of the phase current estimator 204 comprises a tracking unit 214, a slope estimator unit 216 and a slope correcting unit 218. The tracking unit 214 scales the phase current estimate error (Ierror_d) by different gain values (Ktrack_on/off, Ktrack_tr) depending on the state (PWM_HiZ, PWM_on, PWM_off, PWM_tr) of the PWM cycle. The states of the PWM cycle are explained in further detail later herein in connection with FIG. 4. The next tracking estimate (Itrack) is based on the phase current estimate error (Ierror_d). The tracking performed by the tracking unit 214 includes adjusting the next tracking estimate by one polarity if Ierror_d indicates a positive slope error for the phase current and adjusting the next tracking estimate by the opposite polarity if Ierror_d indicates a negative slope error for the phase current. The magnitude of the adjustment can depend on the error amplitude (i.e. the greater the error amplitude, the greater the amount of adjustment).

The slope estimator unit 216 generates an estimate (slope_est) of the phase current depending on the PWM state (PWM_HiZ, PWM_on, PWM_off) of the PWM cycle and voltage parameters associated with operation of the switching power converter such as the input and output voltages (Vin, Vout). For example, the slope estimator unit 216 can generate an estimate (slope_est) of the phase current based on the relationship between the known or assumed positive and negative slopes of the expected phase current (both the positive and negative slopes are inversely proportional to the inductor, and the slope depends on Vin and Vout). In another embodiment, the slope estimator unit 216 can generate an estimate (slope_est) of the phase current based on an assumed shape of the phase current ripple that is a function of the PWM control signal, PWM state or the control signals (GHN, GLN) applied to the gates of the switches or switches (HSN, LSN) of each phase 102. In yet another embodiment, the slope estimator unit 216 can generate a new estimate (slope_est) of the phase current based on steeper negative slope of the phase current when current is flowing through a body diode of the low-side switch (LSN) of each phase 102 to zero.

The slope correcting unit 218 corrects for integration errors in the phase current estimate error (Ierror_d). By performing this correction, the next phase current estimate (Isample) generated by the digital circuitry 208 is adjusted to account for the estimator error. An estimate of the next phase current sample is generated by summing the outputs of the tracking unit 214, the slope estimator unit 216 and the slope correcting unit 218. The summed signal can be accumulated over time by a counter 220 operating at the faster clock rate f2 and down-sampled by a decimator 222 operating at the slower clock rate f1 for input to the analog circuitry 206 as the phase current estimate for the next PWM cycle.

The phase current estimator 204 uses various system parameters such as the input voltage (Vin), output voltage (Vout), body diode voltage drop (Vd), inductance (L), and the state of the PWM control signals during each PWM cycle to generate an estimate (Isample) of the phase current as described above. PWM generator logic 224 generates the PWM state information shown in FIG. 4 based on the PWM control signals generated by the controller, for use by the phase current estimator 204 in estimating the phase current of the switching power converter.

Figure 4:
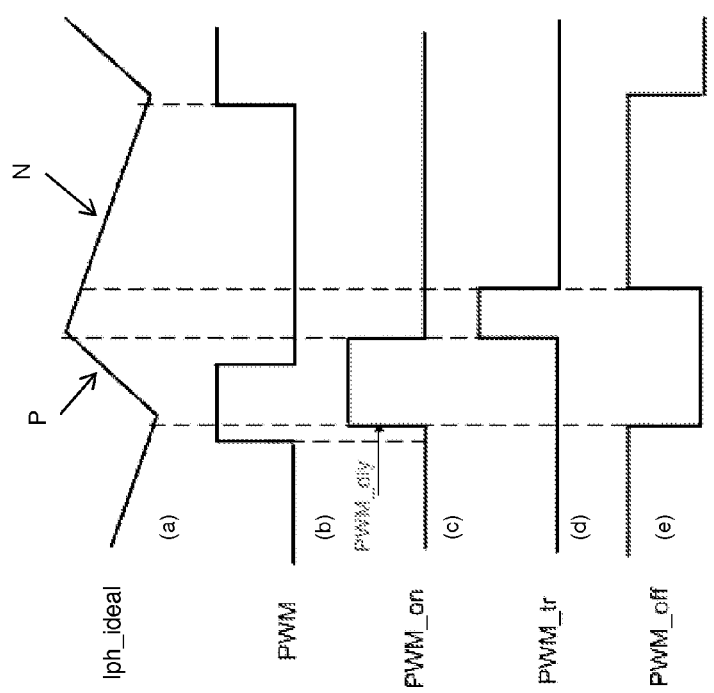
FIG. 4 illustrates various waveform diagrams associated with the PWM operation of the switching power converter.

Waveform (a) of FIG. 4 shows the ideal phase current (Iph ideal), which has an expected sawtooth or triangular ripple pattern. The current delivered to the load 104 by a phase 102 of the switching power converter has the expected waveform (a) in FIG. 4 when that phase 102 functions properly (i.e. as expected or designed) e.g. when there are no faulty switches included in the phase 102, the inductor (L) coupled to the phase 102 is not faulty, the output capacitor (C) is not faulty, and the connections between the phase 102 and the load 104 are not defective. Otherwise the current delivered by the phase 102 will not have the expected waveform (a) in FIG. 4, but instead the positive (P) and/or negative (N) ramp of the phase current will have a steeper or narrower slope than expected or even be missing.

Waveform (b) of FIG. 4 shows the PWM control signal (PWM) applied to the gates of the switches (HSH, LSN) of each phase 102. The PWM control signals include a pulse at the beginning of each PWM cycle followed by an inactive period. Waveform (c) of FIG. 4 shows a delayed version (PWM_on) of the PWM control signal which is for compensating the delay (PWM_dly) between the driver 106 and the corresponding switches (HSH, LSN) of each phase 102. Estimating the phase current based on PWM_on is more accurate than if based on PWM. Waveform (d) of FIG. 4 shows a transition period (PWM_tr) during which the slope estimator unit 216 and the slope correcting unit 218 can be disabled and just the tracking unit 214 provides the feedback loop. Waveform (e) of FIG. 4 shows the remaining period (PWM_off) of the PWM cycle where any transients should be settled and the phase current tracking is the most accurate compared to PWM_tr and PWM_on (the PWM_on state can be very noisy and the PWM_tr state can have ringing). As such, a good estimate of the negative slope of the phase current can be obtained during the PWM_off state. Since the relationship between the output voltage (Vout), the input voltage (Vin) and the PWM duty cycle is known by the controller 200 and available to the phase current estimator 204, the phase current estimator 204 can convert the relatively noise-free negative phase current slope estimate generated during the PWM_off state to a positive slope estimate of the phase current so that the noisy PWM_on state and the ringing PWM_tr state do not adversely affect the positive slope estimate.

Figure 5:
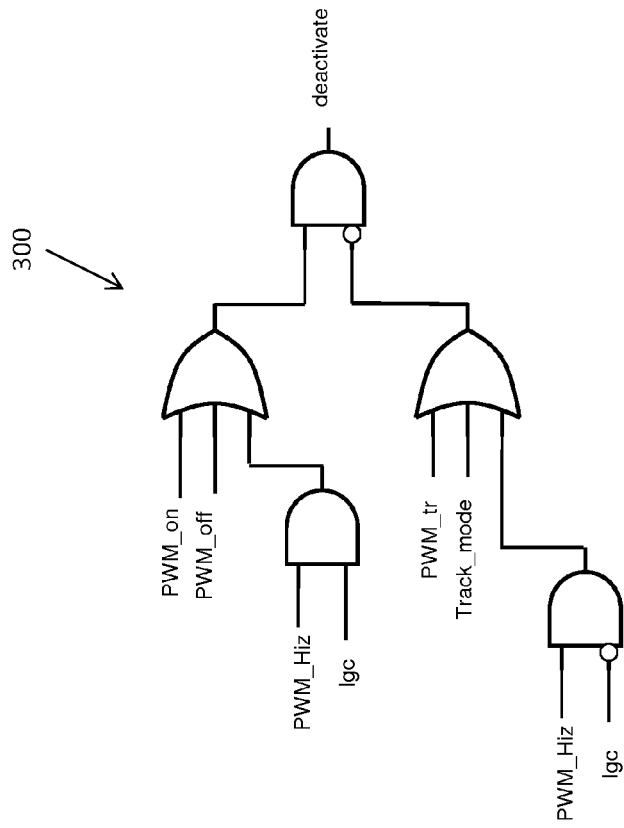
FIG. 5 illustrates a block diagram of an embodiment of a phase current tracking unit of the phase current estimator.
Figure 5:
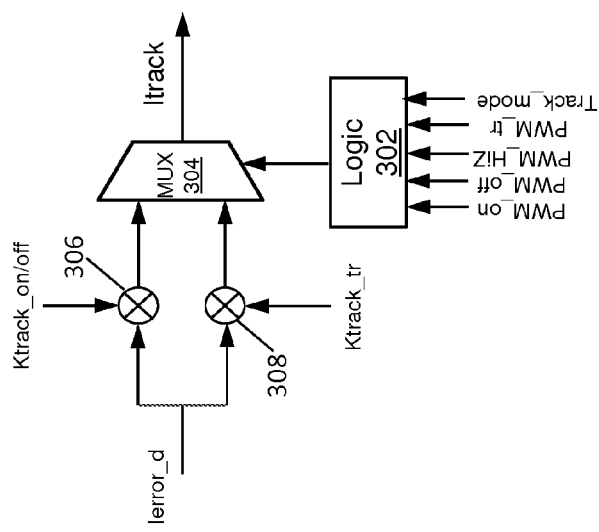
Figure 10:
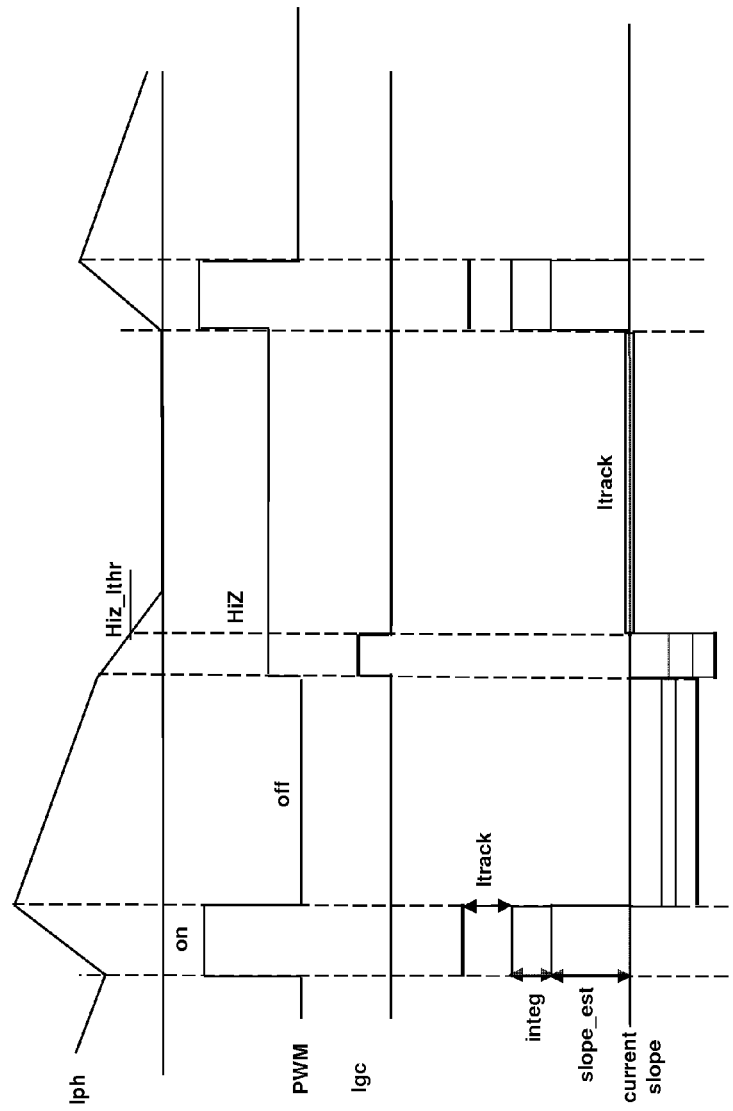
FIG. 10 illustrates various waveform diagrams associated with the operation of the phase current estimator.

FIG. 5 illustrates an embodiment of the tracking unit 214 of the phase current estimator 204. The tracking unit 214 provides a scaled error feedback (Itrack) to the feedback loop. The gain (Ktrack_on/off, Ktrack_tr) for each state (PWM_on, PWM_off and PWM_tr) of the PWM cycle can be different. For example the gains (Ktrack_on/off) for the PWM_on and PWM_off states can be smaller than 1, and the gain (Ktrack_tr) for the PWM_tr state can be close to 1 since there is no estimation and the tracking loop should take over. Using small gains has the advantage of attenuating the propagation noise in the system. In some cases such as low switching frequencies where the phase current changes slowly from a positive ramp to a negative ramp or in sleep mode, the tracking unit 214 by itself can provide good tracking response i.e. the slope estimator unit 216 and the slope correcting unit 218 can be disabled under such conditions if desired. For example in a high impedance (HiZ) mode and once the phase current is lower than a certain value e.g. as indicated by Igc being set low as shown in FIG. 10, the controller 200 can switch to the tracking mode (indicated by the signal labeled Track_mode in FIG. 5) in which the tracking unit 214 remains enabled and the slope estimator unit 216 and the slope correcting unit 218 are disabled. Conversely, the slope estimator unit 216 and the slope correcting unit 218 are enabled if the switching power converter is operating at a high switching frequency at which the phase current changes rapidly from a positive ramp to a negative ramp. To this end, the controller 200 can include digital logic 300 that generates a deactivation signal (deactivate) under these conditions or when the tracking mode signal (Track_mode) indicates deactivation.

The tracking unit 302 includes logic for controlling a MUX (multiplexor) 304 based on the state of the PWM cycle and the status of the tracking mode signal. The tracking unit 214 also includes a first multiplier 306 for scaling the phase current estimate error (Ierror_d) by a first gain value (Ktrack_on) during the on PWM state (PWM_on) in which the PWM pulse is activate for a first part of the PWM cycle and the phase current has a positive slope (P) as shown in waveform (a) of FIG. 4. The same (or different) multiplier 306 can scale the phase current estimate error (Ierror_d) by a second gain value (Ktrack_off) during the off PWM state (PWM_off) in which the PWM pulse is deactivate for a second (later) part of the PWM cycle and the phase current has a negative slope (N) also as shown in waveform (a) of FIG. 4.

The tracking unit 214 further includes an additional multiplier 308 for scaling the phase current estimate error (Ierror_d) by a third gain value (Ktrack_tr) during the transition PWM state (PWM_tr) between the on and off PWM states in which the phase current transitions from a positive ramp (P) to a negative ramp (N) as shown in waveform (a) of FIG. 4. In one embodiment, the second gain value (Ktrack_off) is greater than the first and third gain values (Ktrack_on, Ktrack_tr) so that the phase current estimate error is scaled by a larger value during the off PWM state of the PWM cycle than during the on and transition PWM states which tend to be nosier (PWM_on) and have more ringing (PWM_tr) than PWM_off.

The MUX selection logic 302 determines which scaled version of the phase current estimate error is selected as the output (Itrack) of the tracking unit 214 based on the present state of the PWM cycle. For example, Itrack=Ierror_d*Ktrack_on when the present PWM state is PWM_on, Itrack=Ierror_d*Ktrack_tr when the present PWM state is PWM_tr and Itrack=Ierror_d*Ktrack_off when the present PWM state is PWM_off. In HiZ mode or when the tracking mode signal indicates, the tracking unit 214 can remain enabled and the slope estimator unit 216 and the slope correcting unit 218 can be disabled as explained above.

Figure 6:
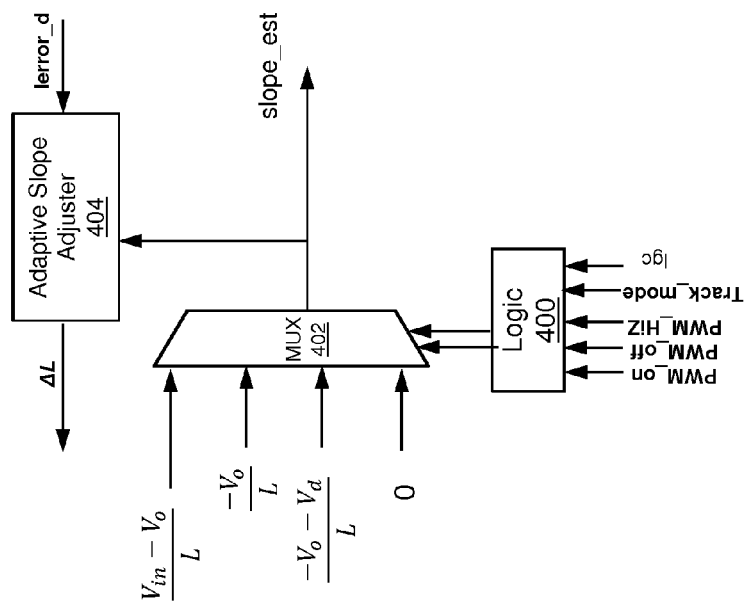
FIG. 6 illustrates a block diagram of an embodiment of a phase current slope estimator unit of the phase current estimator.

FIG. 6 illustrates an embodiment of the slope estimator unit 216 of the phase current estimator 204. The slope estimator unit 216 functions based on monitoring the trivalent input of the PWM control signal, the state of the PWM control signal (on, off, HiZ, etc.) or the control signals (GHN, GLN) applied to switches of each phase 102, and provides an estimate (slope_est) for the phase current. In an ideal case the phase current estimate (Isample) is perfect, the error (Ierror_d) goes to zero, and the tracking unit 214 and also the slope correcting unit 218 will generate any output. In reality due to parameter tolerances and measurement noise, entering an inaccurate value for L (by the user) and also the nonlinearities of the components, the phase current estimate (sample) is not perfect and the tracking unit 214 and the slope correcting unit 218 attempt to reduce the error.

The slope estimator unit 216 includes logic 400 for controlling a MUX 402 based on the state of the PWM cycle and the status of the tracking mode signal (Track_mode). The output (slope_est) of the slope estimator unit 216 corresponds to a first phase current slope estimate of $$\frac{V_{in} - V_0}{L}$$

during the on PWM state (PWM_on), wherein $V_{in}$ is the input voltage of the switching power converter, $V_0$ is the output voltage of the switching power converter and L is the inductance of the inductor coupled between the phase 102 under analysis and the load 104 driven by the switching power converter. The output (slope_est) of the slope estimator unit 216 corresponds to a second phase current slope estimate of $$\frac{-V_0}{L}$$

during the off PWM state (PWM_off). The output (slope_est) of the slope estimator unit 216 corresponds to a third phase current slope estimate of $$\frac{-V_0 - V_d}{L}$$

during high impedance (Hiz) when the phase current is higher than a certain value e.g. as indicated by Igc being set high as shown in FIG. 10, wherein $V_d$ is a body diode voltage drop of the phase 102 i.e. the body diode voltage drop of the low-side switch (LS) of the phase 102. The output (slope_est) of the slope estimator unit 216 corresponds to 0 when the phase is in a high impedance (HiZ) state and the current is not greater than the threshold e.g. as indicated by Igc (see FIG. 10), or in a tracking mode.

The selected output (slope_est) of the slope estimator unit 216 is compared to the phase current estimate error (Ierror_d) by adaptive slope adjuster logic 404 to determine an offset or correction (ΔL) for the inductance. This offset/correction is used to adjust the value L of the inductance used in the current slope estimate calculations described above and shown in FIG. 6, by setting L=ΔL+L0 where L0 is an initial inductance parameter e.g. set by a user of the switching power converter.

Figure 7:
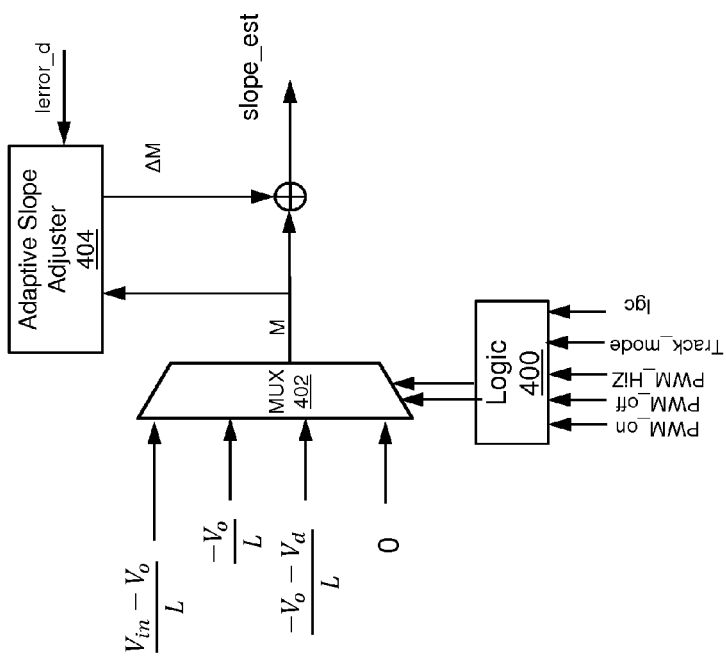
FIG. 7 illustrates a block diagram of another embodiment of a phase current slope estimator unit of the phase current estimator.

FIG. 7 illustrates another embodiment of the slope estimator unit 216 of the phase current estimator 204. The embodiment shown in FIG. 7 is similar to the embodiment shown in FIG. 6, however, the offset/correction determined by the adaptive slope adjuster logic 404 is applied to the output (M) of the MUX 402 as an adjustment value (ΔM) so that the output (slope_est) of the slope estimator unit 216 is given by: slope_est=M+ΔM.

Figure 8:
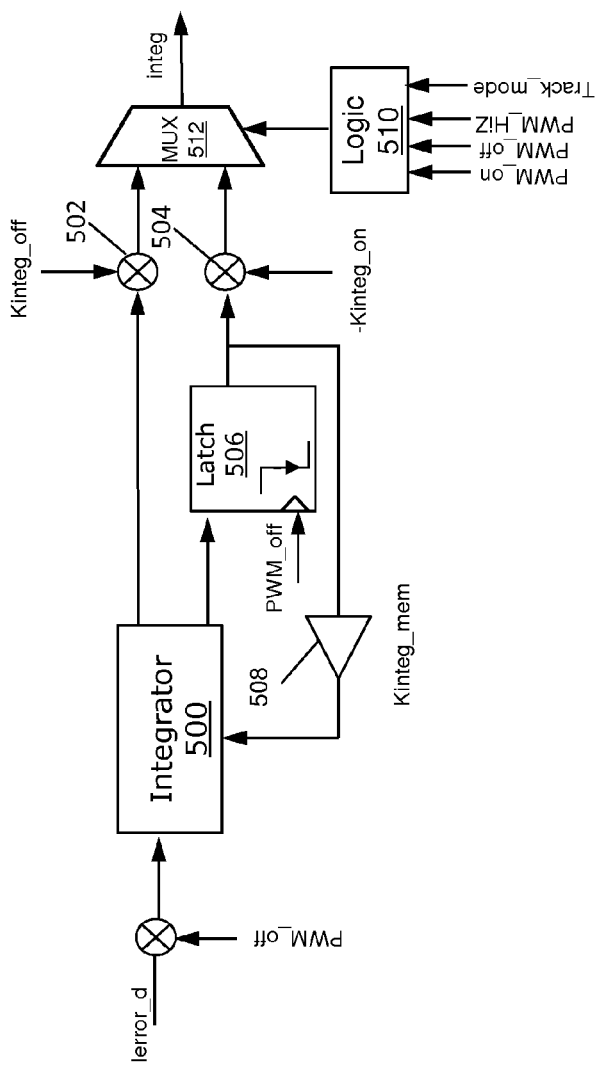
FIG. 8 illustrates a block diagram of an embodiment of a phase current slope correcting unit of the phase current estimator.
Figure 9:
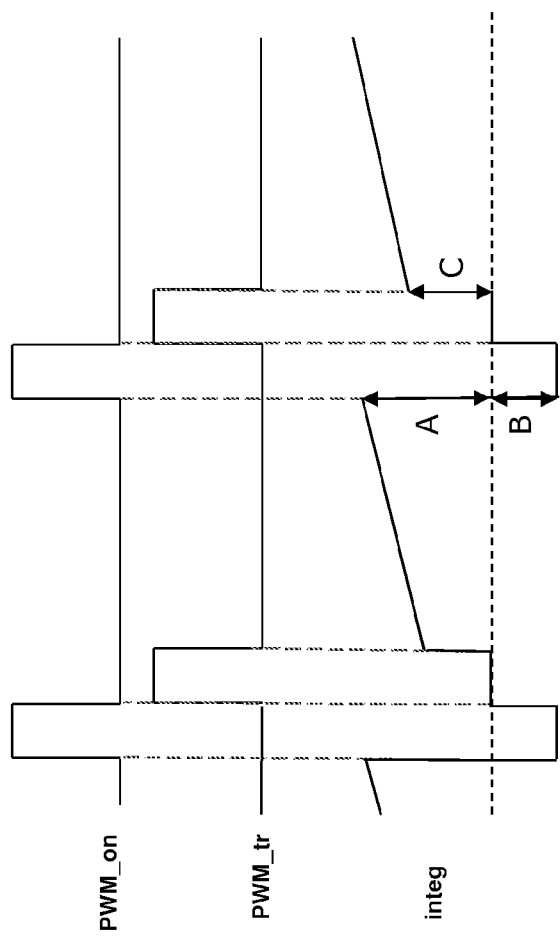
FIG. 9 illustrates various waveform diagrams associated with the operation of the phase current slope correcting unit.

FIG. 8 illustrates an embodiment of the slope correcting unit 218 of the phase current estimator 204. The slope correcting unit 218 reduces the integrated error and compensates for erroneous estimates due to either variability of the inductors or wrong initial estimates by the user of the switching power converter. The slope correcting unit 218 operates in three PWM states: PWM_on, PWM_off and PWM_tr as shown in FIG. 9.

The slope correcting unit 218 includes an integrator 500 and a first multiplier 502 for integrating and scaling, respectively, the phase current estimate error (Ierror_d) by a first gain value (Kinteg_off) during the off PWM state. The integrator 500 runs during the PWM_off state i.e. the least noisy PWM state and can be disabled in the PWM_on and PWM_tr states i.e. the noisier PWM states. The slope correcting unit 218 also includes a second multiplier 504 for scaling a previously integrated version of the phase current estimate error generated during the PWM_off state of the immediately preceding PWM cycle by a second gain value (−Kinteg_on) during the PWM_on state of the present PWM cycle. The previously integrated version of the phase current estimate error can be stored by a latch 506 clocked by the PWM_off state. The slope correcting unit 218 includes a third multiplier 508 for scaling the previously integrated version of the phase current estimate error stored by the latch 506 by a third gain value (Kinteg_mem), for use as an initial starting point in integrating the phase current estimate error (Ierror_d) by the first gain value (Kinteg_off) during the PWM_off state of the current PWM cycle. Digital logic 510 and a MUX 512 control which value is output (integ) by the slope correcting unit 218. The logic 510 and MUX 512 of the slope correcting unit 218 can be operated in the same way as the logic 400 and MUX 402 of the slope estimator unit 216 shown in FIGS. 6 and 7. In FIG. 9, A=Kinteg_off, B=−Kinteg_on*A and C=Kinteg_mem*A.

FIG. 10 shows a purely illustrative example of the individual components of the phase current estimate (Isample) generated by the phase current estimator 204, as provided by the tracking unit 214, the slope estimator unit 216 and the slope correcting unit 218. Indicator Igc indicates when the phase current is greater than a threshold value Hiz_Ithr. Igc is set high once the phase is in HiZ state and the phase current is greater than Hiz_Ithr. Otherwise, Igc is set to zero. The contribution (slope_est) by the slope estimator unit 216 can for example be around 80% to 90% of the combined phase current estimate (Isample) during the on PWM state (PWM_on), whereas the combined contribution (Itrack+integ) of the tracking unit 214 and the slope correcting unit 218 can for example be around 10% to 20% during PWM_on. The contribution of the slope correcting unit 218 can be for example in the range of 20% to 30% depending on the corresponding gains. These percentages are purely exemplary and can shift during the other states of the PWM cycle. For example, Isample can equal Itrack during HiZ mode as previously described herein i.e. the slope estimator unit 216 and the slope correcting unit 218 can be disabled in the HiZ mode of the switching power converter. Also, the contribution of slope_est can range between 80% to 120% due to the unknown exact value of L and/or other parasitics.

The switching power converter can further include an estimator fault detection unit 226 included in or associated with the converter controller as shown in FIG. 1. The estimator fault detection unit 226 detects bad or poor (substandard) tracking performance of the phase current estimator 204. For instance, very poor slope estimation because a highly incorrect value for L or bad tuning is used may result in poor phase current tracking. The estimator fault detection unit 226 indicates whether the phase current tracking is being done very well (i.e. within some standard or norm) and the error between the estimated and phase currents remains very big.

In more detail, the estimator fault detection unit 226 compares the phase current (Iph) to the phase current estimate (Isample) to determine whether a difference (error) between the phase current and the phase current estimate exceeds a threshold for indicating substandard (i.e. deviating from or falling short of a standard or norm) phase current estimation. The threshold is selected to indicate substandard phase current tracking. The controller 200 can take corrective action responsive to an indication of substandard phase current estimation generated by the estimator fault detection unit 226. For example, the problematic phase(s) can be deactivated or the switching power converter can be shut down.

Figure 11:
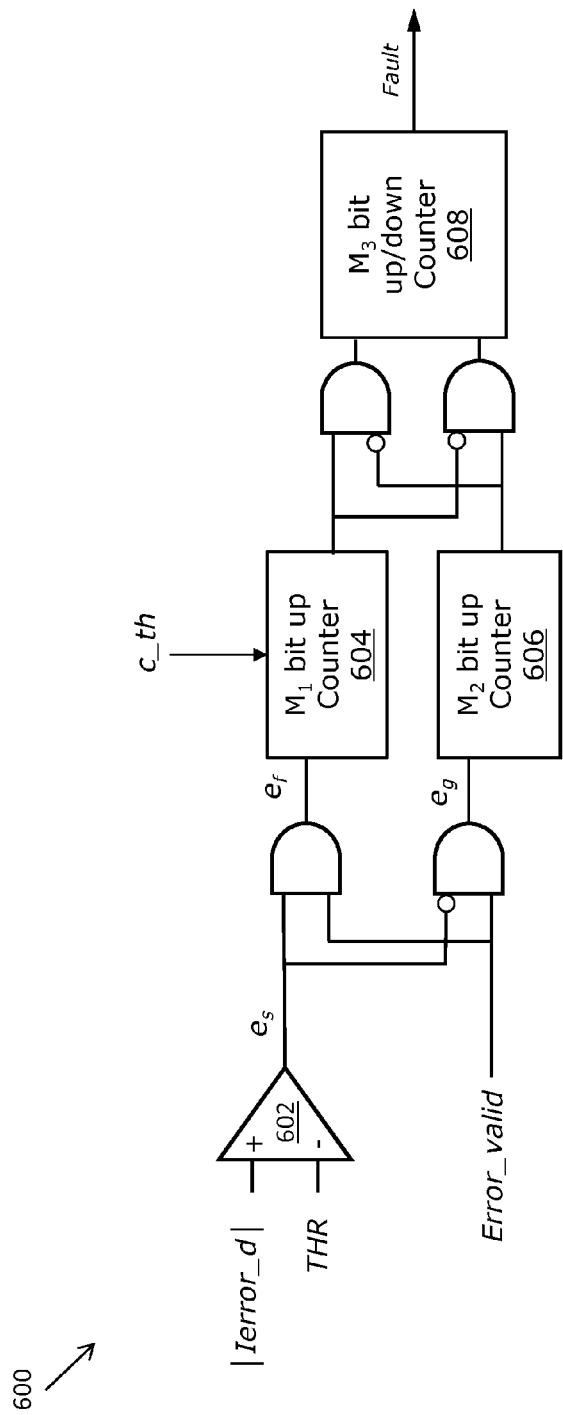
FIG. 11 illustrates a block diagram of an embodiment of the estimator fault detection unit.

FIG. 11 illustrates an embodiment of an estimator fault detector 600 included in or associated with the estimator fault detection unit 226. According to this embodiment, the estimator fault detector 600 includes a comparator 602 for comparing the absolute value of the error |Ierror_d| to a threshold (THR). If |Ierror_d|≥THR, $e_s$ becomes high meaning that the error is big enough. At some part of the cycle the error is big for example at the beginning of the on time or during PWM_tr, so signal Error_valid indicates when $e_s$ is valid. A first counter 604 counts up and resets at c_th once signal $e_f$ (faulty case) is high. For the rest of the cycle (e.g. good case) a second counter 606 counts up and rests once it reaches its limit. For instance if the second counter 606 has M2 bits and the first counter 604 is set to reset at c_th, then C_th/(c_th+ 2^M2) represents the threshold that if the fault happens more than that a third counter 608 starts counting up until it reaches its maximum and declares a fault. The third counter 608 tracks the faulty conditions that last for M3 bits. For example: if c_th=8 and M2=5 bits, then the fault threshold is 20% meaning if the fault condition lasts for more than 20% of a cycle then the third counter 608 counts one up. If this condition persists for 2^M3 times then the fault will be declared.

Figure 12:
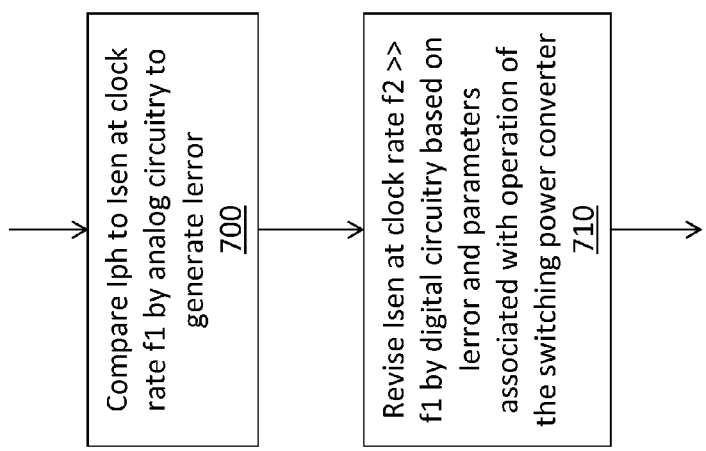
FIG. 12 illustrates a flow diagram of an embodiment of a method of phase current estimation in a switching power converter.

FIG. 12 illustrates an embodiment of estimating phase current in the switching power converter. The method comprises comparing a phase current (Iph) of the switching power converter to an analog representation (Iph_estimate) of the sampled phase current estimate (Isample) at a first clock rate (f1) by analog circuitry to generate a phase current estimate error (Ierror), the first clock rate being insufficient to accurately track the phase current (Block 700). The method further comprises revising the phase current estimate (Isample) at a second clock rate (f2) greater than the first clock rate by digital circuitry based on the phase current estimate error (Ierror) and a plurality of parameters associated with operation of the switching power converter, so as to estimate the phase current at a higher clock rate in the digital domain than supported by the analog circuitry (Block 710). The method can further comprise comparing the phase current to the phase current estimate to determine whether a difference between the phase current and the phase current estimate exceeds a threshold for indicating substandard phase current estimation.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A phase current estimator, comprising:
  analog circuitry operable to generate a phase current estimate error by comparing a phase current of a switching power converter to an analog representation of an estimate of the phase current; and
  digital circuitry operable to revise the phase current estimate based on the phase current estimate error and a plurality of parameters associated with operation of the switching power converter,
  wherein the digital circuitry comprises:
    a tracking unit operable to scale the phase current estimate error by different gain values during different PWM (pulse width modulation) states of a PWM cycle of the switching power converter;
    a slope estimator unit operable to generate by integration a new estimate of the phase current based on the different PWM states of the PWM cycle and voltage parameters associated with operation of the switching power converter; and
    a slope correcting unit operable to correct for integration errors in the phase current estimate error.

2. The phase current estimator of claim 1, wherein the analog circuitry comprises:
  a DAC (digital-to-analog converter) operable to convert the phase current estimate generated by the digital circuitry to the analog representation of the phase current estimate; and
  an ADC (analog-to-digital converter) operable to convert an analog error signal corresponding to the difference between the analog representation of the phase current estimate and the phase current to a digital error signal, the digital error signal corresponding to the phase current estimate error analyzed by the digital circuitry.

3. The phase current estimator of claim 1, wherein the tracking unit is operable to:
  scale the phase current estimate error by a first gain value during an on PWM state in which a PWM pulse is activate for a first part of the PWM cycle and the phase current has a positive slope;
  scale the phase current estimate error by a second gain value during an off PWM state in which the PWM pulse is deactivate for a second part of the PWM cycle and the phase current has a negative slope; and
  scale the phase current estimate error by a third gain value during a transition PWM state between the on and off PWM states and the phase current transitions from a positive ramp to a negative ramp.

4. The phase current estimator of claim 3, wherein the second gain value is greater than the first and third gain values so that the phase current estimate error is scaled by a larger value during the off PWM state of the PWM cycle than during the on and transition PWM states of the PWM cycle.

5. The phase current estimator of claim 1, wherein the slope estimator unit and the slope correcting unit are enabled if the switching power converter is operating at a high switching frequency at which the phase current changes rapidly from a positive ramp to a negative ramp, and wherein the slope estimator unit and the slope correcting unit are disabled if the switching power converter is in a high impedance mode or if the switching power converter is operating at a low switching frequency at which the phase current changes slowly from a positive ramp to a negative ramp.

6. The phase current estimator of claim 1, wherein the slope estimator unit is operable to:
  generate a first phase current slope estimate of $$\frac{V_{in} - V_0}{L}$$

during an on PWM state in which a PWM pulse is activate for a first part of the PWM cycle and the phase current has a positive slope, wherein $V_{in}$ is an input voltage of the switching power converter, $V_0$ is an output voltage of the switching power converter and L is the inductance of an inductor coupled between the phase under analysis and a load driven by the switching power converter;
  generate a second phase current slope estimate of $$\frac{-V_0}{L}$$

during an off PWM state in which the PWM pulse is deactivate for a second part of the PWM cycle and the phase current has a negative slope; and
  generate a third phase current slope estimate of $$\frac{-V_0 - V_d}{L}$$

during high impedance when the phase current is higher than a predetermined value, wherein $V_d$ is a body diode voltage drop of the phase.

7. The phase current estimator of claim 6, wherein the slope estimator unit is operable to generate a fourth phase current slope estimate of 0 when the phase in a high impedance state.

8. The phase current estimator of claim 1, wherein the slope correcting unit is operable to:
  integrate and scale the phase current estimate error by a first gain value during an off PWM state in which a PWM pulse is deactivate for a second part of the PWM cycle and the phase current has a negative slope; and
  scale a previously integrated version of the phase current estimate error generated during the off PWM period of an immediately preceding PWM cycle by a second gain value during an on PWM state in which the PWM pulse is activate for a first part of the PWM cycle and the phase current has a positive slope.

9. The phase current estimator of claim 8, wherein the slope correcting unit is operable to scale a previously integrated version of the phase current estimate error generated during the off PWM period of an immediately preceding PWM cycle by a third gain value for use as an initial starting point in integrating the phase current estimate error by the first gain value during the off PWM state of the PWM cycle.

10. The phase current estimator of claim 1, wherein the digital circuitry is operable to revise the phase current estimate by combining outputs of the tracking unit, the slope estimator unit and the slope correcting unit into a combined phase estimate signal.

11. The phase current estimator of claim 1, wherein the analog circuitry is operable to generate the phase current estimate error at a first clock rate insufficient to accurately track the phase current, and wherein the digital circuitry is operable to revise the phase current estimate at a second clock rate greater than the first clock rate so as to estimate the phase current at a higher clock rate in the digital domain than supported by the analog circuitry.

12. The phase current estimator of claim 11, wherein the digital circuitry comprises a counter operable to accumulate the combined phase estimate signal over time at the second clock rate to provide the phase current estimate for the next PWM cycle.

13. The phase current estimator of claim 12, wherein the digital circuitry comprises a decimator operable to down-sample the phase current estimate provided by the counter at the first clock rate for input to a DAC of the analog circuitry, the DAC being operable to generate the analog representation of the phase current estimate from the down-sampled phase current estimate provided by the decimator.

14. A switching power converter, comprising:
a phase operable to deliver a phase current to a load; and
a phase current estimator, comprising:
analog circuitry operable to generate a phase current estimate error by comparing a phase current of a switching power converter to an analog representation of an estimate of the phase current; and
digital circuitry operable to revise the phase current estimate based on the phase current estimate error and a plurality of parameters associated with operation of the switching power converter,
wherein the digital circuitry comprises:
a tracking unit operable to scale the phase current estimate error by different gain values during different PWM (pulse width modulation) states of a PWM cycle of the switching power converter;
a slope estimator unit operable to generate by integration a new estimate of the phase current based on the different PWM states of the PWM cycle and voltage parameters associated with operation of the switching power converter; and
a slope correcting unit operable to correct for integration errors in the phase current estimate error.

15. The switching power converter of claim 14, further comprising:
an estimator fault detection unit operable to compare the phase current to the phase current estimate to determine whether a difference between the phase current and the phase current estimate exceeds a threshold for indicating substandard phase current estimation.

16. The switching power converter of claim 15, wherein the phase current estimate generated by the digital circuitry has a positive slope component and a negative slope component, and wherein the estimator fault detection unit is operable to determine whether the difference between the phase current and the positive slope component exceeds a first threshold indicating a positive slope error in the phase current and whether the difference between the phase current and the negative slope component exceeds a second threshold indicating a negative slope error in the phase current.

17. The switching power converter of claim 14, wherein the tracking unit is operable to:
scale the phase current estimate error by a first gain value during an on PWM state in which a PWM pulse is activate for a first part of the PWM cycle and the phase current has a positive slope;
scale the phase current estimate error by a second gain value during an off PWM state in which the PWM pulse is deactivate for a second part of the PWM cycle and the phase current has a negative slope; and
scale the phase current estimate error by a third gain value during a transition PWM state between the on and off PWM states and the phase current transitions from a positive ramp to a negative ramp.

18. The switching power converter of claim 14, wherein the slope estimator unit is operable to:
generate a first phase current slope estimate of $$\frac{V_{in} - V_0}{L}$$

during an on PWM state in which a PWM pulse is activate for a first part of the PWM cycle and the phase current has a positive slope, wherein $V_{in}$ is an input voltage of the switching power converter, $V_0$ is an output voltage of the switching power converter and L is the inductance of an inductor coupled between the phase under analysis and a load driven by the switching power converter;
generate a second phase current slope estimate of $$\frac{-V_0}{L}$$

during an off PWM state in which the PWM pulse is deactivate for a second part of the PWM cycle and the phase current has a negative slope; and
generate a third phase current slope estimate of $$\frac{-V_0 - V_d}{L}$$

during high impedance when the phase current is higher than a predetermined value and the phase current transitions from a positive ramp to a negative ramp, wherein $V_d$ is a body diode voltage drop of the phase.

19. The switching power converter of claim 14, wherein the slope correcting unit is operable to:
integrate and scale the phase current estimate error by a first gain value during an off PWM state in which a PWM pulse is deactivate for a second part of the PWM cycle and the phase current has a negative slope; and
scale a previously integrated version of the phase current estimate error generated during the off PWM period of an immediately preceding PWM cycle by a second gain value during an on PWM state in which the PWM pulse is activate for a first part of the PWM cycle and the phase current has a positive slope.

20. The switching power converter of claim 14, wherein the analog circuitry of the phase current estimator is operable to generate the phase current estimate error at a first clock rate insufficient to accurately track the phase current, and wherein the digital circuitry of the phase current estimator is operable to revise the phase current estimate at a second clock rate greater than the first clock rate so as to estimate the phase current at a higher clock rate in the digital domain than supported by the analog circuitry.

21. A switching power converter, comprising:
a phase operable to deliver a phase current to a load; and
a phase current estimator, comprising:
- analog circuitry operable to generate a phase current estimate error by comparing a phase current of a switching power converter to an analog representation of an estimate of the phase current; and
- digital circuitry operable to revise the phase current estimate based on the phase current estimate error and a plurality of parameters associated with operation of the switching power converter, wherein the analog circuitry of the phase current estimator is operable to generate the phase current estimate error at a first clock rate insufficient to accurately track the phase current, wherein the digital circuitry of the phase current estimator is operable to revise the phase current estimate at a second clock rate greater than the first clock rate so as to estimate the phase current at a higher clock rate in the digital domain than supported by the analog circuitry.

* * * * *